United States Patent
Tafaghodi Khajavi et al.

(10) Patent No.: US 11,995,053 B2
(45) Date of Patent: May 28, 2024

(54) SYSTEMS AND METHODS FOR ASSET IDENTIFICATION STRING ERROR DETECTION AND CORRECTION

(71) Applicant: Caterpillar Inc., Peoria, IL (US)

(72) Inventors: Navid Tafaghodi Khajavi, Kenmore, WA (US); James Mason, Champaign, IL (US); Daniela Radakovic, Chicago, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/854,771

(22) Filed: Jun. 30, 2022

(65) Prior Publication Data

US 2024/0004845 A1   Jan. 4, 2024

(51) Int. Cl.
*G06F 16/00* (2019.01)
*G06F 16/215* (2019.01)

(52) U.S. Cl.
CPC ................. *G06F 16/215* (2019.01)

(58) Field of Classification Search
CPC ..... G06F 16/215; G06Q 10/087; G06Q 10/10
See application file for complete search history.

(56) References Cited

U.S. PATENT DOCUMENTS

| | | | |
|---|---|---|---|
| 6,259,354 B1* | 7/2001 | Underwood | G06Q 10/10 340/10.6 |
| 8,548,968 B2 | 10/2013 | Zak, Jr. et al. | |
| 10,824,500 B1* | 11/2020 | Shoemaker | G07C 5/12 |
| 2021/0097306 A1 | 4/2021 | Crary et al. | |

FOREIGN PATENT DOCUMENTS

| | | |
|---|---|---|
| CN | 104732313 A | 6/2015 |
| CN | 111582304 A | 8/2020 |
| CN | 111797195 A | 10/2020 |
| WO | 2021007624 A1 | 1/2021 |

OTHER PUBLICATIONS

Written Opinion and International Search Report for Int'l. Patent Appln. No. PCT/US2023/021967, dated Aug. 2, 2023 (13 pgs).

* cited by examiner

*Primary Examiner* — Paul Kim

(57) ABSTRACT

A method for asset identification string error detection can include receiving an asset identification string corresponding to an asset and aggregating data associated with the asset from multiple sources. The method can include creating one or more probabilistic tables linking the aggregated data to the asset and determining a likelihood that at least a portion of the asset identification string is correct based on the probabilistic tables. The method can indicate that the asset identification string includes an error when the likelihood is less than a selected threshold and otherwise indicate that the asset identification string is correct when the likelihood is greater than or equal to the selected threshold.

15 Claims, 5 Drawing Sheets

SYSTEMS AND METHODS FOR ASSET IDENTIFICATION STRING ERROR DETECTION AND CORRECTION

TECHNICAL FIELD

This patent application is directed to validating identification numbers, and more specifically, to detecting and correcting errors in erroneous asset identification strings that otherwise appear correct and valid.

BACKGROUND

The use of unique asset identification strings (as with serial numbers, vehicle identification numbers (VIN), etc.) allow each asset to be uniquely identified. When used in conjunction with gathered data for an asset, asset identification strings allow for data sets from various sources to be combined and easily understood. Data from disparate sources may refer to a single unique asset, and to determine this, a unique asset identification string or identifier (ID) is used across all sources.

However, because the asset IDs are manually entered into many data sets, the entered IDs are prone to user error. Typos, misread ID numbers, and incorrect information may be entered into a data set. As such, this makes the data with the incorrect ID number useless for analysis on the asset level. Depending on the use case, asset IDs may or may not follow a specific format. Incorrect asset ID numbers fall into two categories. The trivially wrong—where the format is simple incorrect—and the non-trivially wrong. In the non-trivial case, the asset ID number follows the proper formatting and may be a valid asset ID, but the asset from which the data was created uses a different asset ID.

Efforts have been made to develop systems for asset identification validation. For example, U.S. Pat. No. 6,259,354 to Underwood, (hereinafter "Underwood") describes systems and methods for automated inspection and correction of VINs. Underwood's system is directed to identifying VIN numbers with illegal characters and/or characters or numbers that are in a position where they should not be according to standard VIN format. Underwood then replaces the error with another character or number according to those appropriate for the position and/or based on similar appearance to the incorrect character. Underwood then checks if the VIN matches any numbers in the system. However, Underwood does not address the situation where a VIN number has been incorrectly entered yet still correctly matches the VIN format and matches an existing entry. In other words, Underwood does not identify or correct the situation where information has been associated with the wrong VIN number.

Thus, there is still a need to identify and correct errors in erroneous asset identification strings that otherwise appear correct and valid. The example systems and methods described herein are directed to overcoming one or more of the deficiencies described above and/or other problems with the prior art.

SUMMARY

In some embodiments, a method for asset identification string error detection can include receiving an asset identification string corresponding to an asset and aggregating data associated with the asset from multiple sources. The method can include creating one or more probabilistic tables linking the aggregated data to the asset and determining a likelihood that at least a portion of the asset identification string is correct based on the one or more probabilistic tables. The method can indicate that the asset identification string includes an error when the likelihood is less than a selected threshold and otherwise indicate that the asset identification string is correct when the likelihood is greater than or equal to the selected threshold.

According to some aspects, the asset identification string can include at least a prefix substring and a root substring. In some aspects, the portion of the asset identification string is the prefix substring. In still further aspects, the portion of the asset identification string is the root substring. In some aspects, the method can further comprise, when the asset identification string includes an error, replacing the portion with a replacement string when the replacement string has a probability based on the tables greater than a predefined threshold or otherwise generating at least one replacement string recommendation. According to some aspects, the method can further comprise presenting the replacement string or replacement string recommendations to a user for verification. In some aspects, the multiple sources comprise at least one of owner data, dealer data, manufacturing data, and sales data.

In some embodiments, a method for asset identification string error detection and correction can include receiving an asset identification string corresponding to an asset and aggregating data associated with the asset from multiple sources. The method can include creating one or more probabilistic tables linking the aggregated data to the asset and determining a likelihood that at least a portion of the asset identification string is correct based on the one or more probabilistic tables. The method can indicate that the asset identification string includes an error when the likelihood is less than a selected threshold and otherwise indicate that the asset identification string is correct when the likelihood is greater than or equal to the selected threshold. When the asset identification string includes an error, the portion is replaced with a replacement string when the replacement string has a probability based on the tables greater than a predefined threshold or otherwise at least one replacement string recommendation is generated.

According to some aspects, the asset identification string includes at least a prefix substring and a root substring. In some aspects, the portion of the asset identification string is the prefix substring. In still further aspects, the portion of the asset identification string is the root substring. In some aspects, the multiple sources comprise at least one of owner data, dealer data, manufacturing data, and sales data. According to some aspects, the method can further comprise presenting the replacement string or replacement string recommendations to a user for verification.

In some embodiments, a system for determining asset identification string error detection can include one or more processors and one or more memory devices having instructions stored thereon. When executed, the instructions cause the one or more processors to receive an asset identification string corresponding to an asset and aggregate data associated with the asset from multiple sources. The processors can create one or more probabilistic tables linking the aggregated data to the asset and determine a likelihood that at least a portion of the asset identification string is correct based on the one or more probabilistic tables. The processor can also indicate that the asset identification string includes an error when the likelihood is less than a selected threshold and otherwise indicate that the asset identification string is correct when the likelihood is greater than or equal to the selected threshold.

According to some aspects, the asset identification string includes at least a prefix substring and a root substring. In some aspects, the portion of the asset identification string is the prefix substring. In still further aspects, the portion of the asset identification string is the root substring. In some aspects, the instructions further comprise, when the asset identification string includes an error, replacing the portion with a replacement string when the replacement string has a probability based on the tables greater than a predefined threshold or otherwise generating at least one replacement string recommendation. In some aspects, the instructions further comprise presenting the replacement string or replacement string recommendations to a user for verification. In still further aspects, the multiple sources comprise at least one of owner data, dealer data, manufacturing data, and sales data.

BRIEF DESCRIPTION OF THE DRAWINGS

The systems and methods described herein may be better understood by referring to the following Detailed Description in conjunction with the accompanying drawings, in which like reference numerals indicate identical or functionally similar elements.

Figure 1:
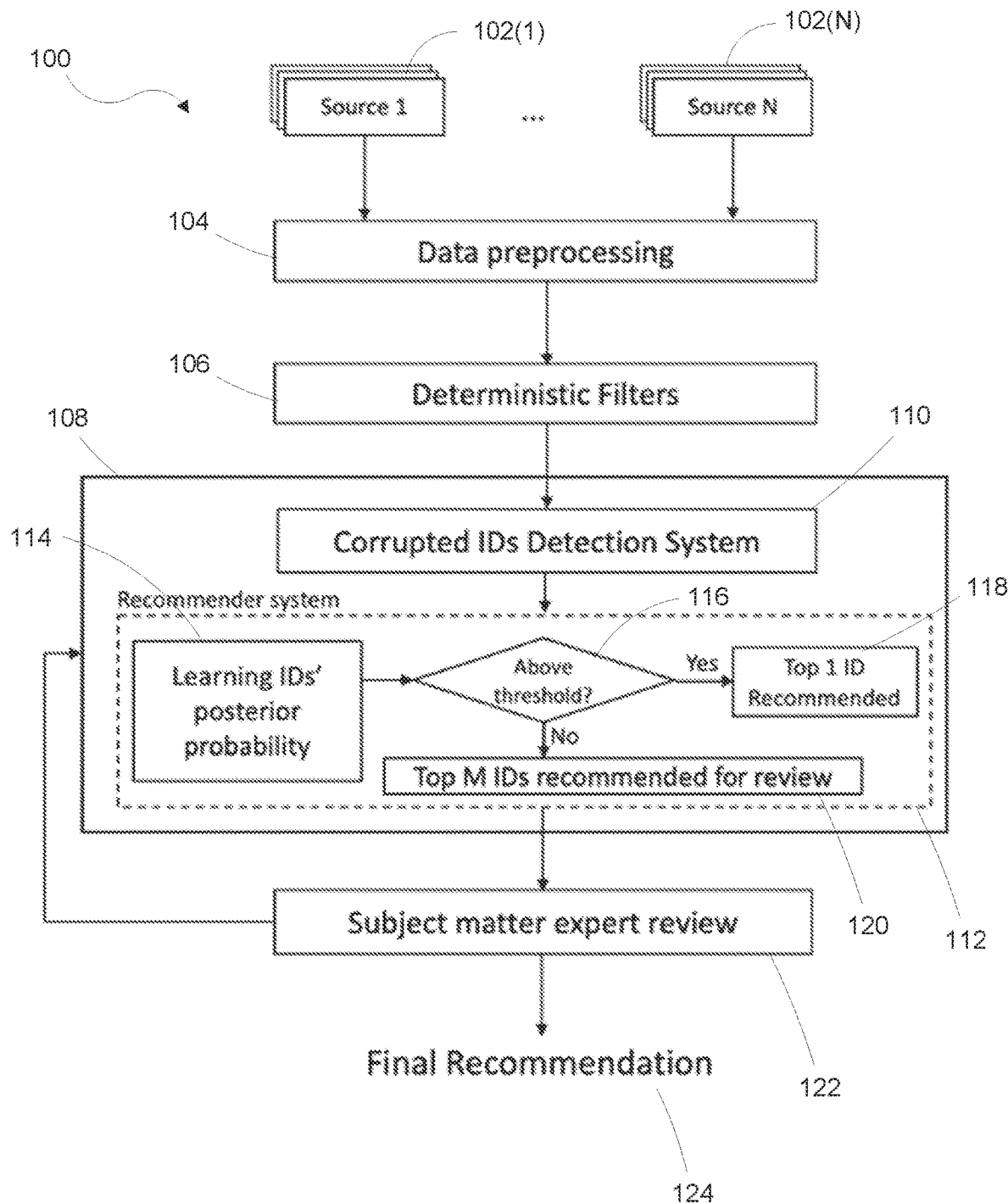
FIG. 1 is a block diagram illustrating an overview of a system for asset identification string error detection and correction according to some embodiments of the disclosed technology.

The headings provided herein are for convenience only and do not necessarily affect the scope of the embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to unnecessarily limit the embodiments described. On the contrary, the embodiments are intended to cover all suitable modifications, combinations, equivalents, and alternatives falling within the scope of this disclosure.

DETAILED DESCRIPTION

Various examples of the systems and methods introduced above will now be described in further detail. The following description provides specific details for a thorough understanding and enabling description of these examples. One skilled in the relevant art will understand, however, that the techniques and technology discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

Disclosed are methods and systems for identifying and correcting errors in erroneous asset identification strings that otherwise appear correct and valid. The use of unique asset identification strings allow each asset to be uniquely identified. However, as the asset ID are manually entered in many data sets, this makes them prone to user error. Incorrect asset ID numbers fall into two categories. The trivially wrong—where the format is simply incorrect—and the non-trivially wrong. In the trivial case, the string can be checked against e.g., rules, ranges, and formats to identify erroneous strings. In the non-trivial case, the asset ID number follows the proper formatting and may be a valid asset ID, but the asset from which the data was created uses a different asset ID. To identify a non-trivial case, all of the records for a particular string are compiled. The information that should be consistent across all of those records, such as owner, dealer where the asset was purchased, industry in which the asset is used, etc., are matched with each other. If a record includes information that does not match up with e.g., a majority of the records, it is likely that the asset identification string corresponding to that record was entered incorrectly. By matching the information in the record of the erroneous asset identification string with other records that do contain similar information, one or more correct identification string candidates can be identified and suggested to a user for verification.

As shown in FIG. 1, the system 100 can include a data preprocessing module 104 that is configured to collect relevant data records from different processes and sources 102(1)-102(N) from across the supply chain to create a unified view (e.g., a corpus of data) for a selected asset identification string corresponding to an asset. The preprocessing module 104 can be configured to remove outliers, cleanse the data for model building, and reformatting data into a usable format for processing.

In some embodiments, data cleansing can include cleaning the data based on business rules to ensure fair comparisons as the data is prepared for the model. For example, business rules can be tuned to ensure that all alphabetical characters are in uppercase or lowercase, and unwanted white spaces, special characters, etc. are removed. In some embodiments, data cleansing techniques can include techniques to remove duplicates, standardize capitalization, convert data types (string, integer, float, datetime, etc.), clear formatting (e.g. time format), handle missing values by imputation using internal data tables and proprietary datasets, standardize data fields by string matching and using internal datasets (e.g. simplified sales model numbers), and clean up special characters and spaces according to internal data definitions, for example.

In some embodiments, the system 100 can include a filtering module 106. The filtering module 106 can be configured to filter out any deterministic aspect of the process. This also reduces the dimensionality and complexity of the problem. For example, the problem space can be projected into a lower dimensionality subspace, which not only lowers the complexity, but also increases the reliability of the solution.

A detection and correction module 108 can include a detection system 110 and a recommendation system 112. The detection system 110 detects if a record among the corpus of data has an invalid asset identification string. The recommendation system 112 is tuned to suggest a valid asset identification string for strings flagged by the detector 110. Detection of non-trivial errors involves observing a large corpus of data (i.e., sources 102(1)-102(N)) related to each asset. As mentioned above, this data can come from a variety of sources, and contains data related to each asset. This may contain, but is not limited to, owner, dealer where the asset was purchased, industry in which the asset is used, etc. Using this corpus of data, the system 110 can develop probabilistic tables linking the related records to each asset. In some embodiments, this is an automated process. Any suitable method can be used to compute these tables. Although in this case, a Naïve Bayes algorithm is combined with a string-matching approach, any known machine learning technique can be used instead to create these probability tables. The Naïve Bayes algorithm can be applied in this case by taking the frequency of values in a variable in the source data with respect to a second target variable, and then divided by the sum of all frequencies with respect to each target value.

The system 110 is configured to determine a likelihood that an asset identification string for a record is correct based on these probabilistic tables. In some embodiments, a meta learner combines these probability tables to arrive at the resultant probability. The meta learner can be any suitable machine learning algorithm or a rule-based approach. For example, using a Bayesian framework, a reasonable approach is to multiply probabilities (meta learner) to produce the result. In some embodiments, the system can indicate that the asset identification string includes an error when the likelihood is less than a selected threshold or indicate that the asset identification string is correct when the likelihood is greater than or equal to the selected threshold. In other words, if the record corresponding to the asset identification string includes information that does not match up with the majority of the records in the corpus of data for that asset, it is likely that the asset identification string corresponding to that record was entered incorrectly. In some embodiments, the selected threshold can be a tunable number, such as values between 80% to 90%. Having a tunable threshold allows the quality of the recommendation to be managed versus the volume of recommendation. The threshold can be adjusted using a closed feedback loop, i.e. using the feedback received from dealers and experts, to maximize the number of recommendation made, while keeping the number of mistakes by the algorithms below an acceptable level.

When the detection system 110 detects that an asset identification string is invalid, the recommendation system 112 can suggest a recommended replacement string or generate multiple replacement string recommendations. The recommendation system 112 can receive the values at 114 and determine at 116 if a candidate replacement string has a probability of being correct that is greater than a predefined threshold. In some embodiments, the predefined threshold can be a tunable number, such as values between 80% to 90%. If the candidate replacement string has a probability greater than the predefined threshold, the system can automatically replace the string or suggest a single replacement string at 118. Otherwise, if the candidate replacement string has a probability less than or equal to the predefined threshold, the system can generate a list of recommended replacement strings at 120 comprising a selected number M of the highest probability replacement strings. In some embodiments, the replacement strings can be reviewed and verified by a subject matter expert at 122 before a final recommendation 124 is presented and/or the asset identification string is corrected in the data. In some embodiments, the verification results from 122 can be fed back to the detection and correction module 108 to incrementally and continuously improve its performance.

In some embodiments, the process can be fully automated by limiting the system to only replace strings with a high probability of being correct. In some embodiments, the suggested replacement string can be added to the output data set while retaining the original input string and flagging it as potential replacement after verification from an outside source for cases where review by expert is needed. In general, the system provides the alternatives, along with information specific as to why the alternative is suggested. This can include listing the input probability table entries that lead to the suggested alternative and providing them the probability entries from the original string so that the expert verifying the change can compare and contrast the numbers to make an informed decision. Table 1 below provides examples of information that can be provided to the subject matter expert for evaluating proposed changes.

TABLE 1

| Serial Number | Entered Sales Model | Valid Sales Models | Likely Prefix | Probability of Likely Prefix |
|---|---|---|---|---|
| LAR05627 | 419K | 712 | LRA | 0.09762 |
| 7TK03249 | C2D | 720 | 7KT | 0.01159 |
| 2AB00427 | 996R | 725 | A2B | 0.00498 |
| 5NE02351 | 935T | 745 | 6NE | 0.01612 |
| VLT01288 | 230J | 962 | VTL | 0.03819 |
| VLT03169 | 230J | 962 | VTL | 0.05615 |
| LDX00104 | 356D | 718 | LXD | 0.00374 |
| XJS03207 | 550S | K9 | XSJ | 0.02239 |

In the examples of Table 1, the system has evaluated if the prefix for each serial number (first three characters) is correct. Each prefix is associated with only a single sales model (listed here as the "valid sales model"). In the example data, the entered sales models are wildly different. When the entered prefix is compared to the list of possible prefixes for the entered sales models, the system identifies that the "likely prefixes" have the same letters as the entered prefix and those prefixes are associated to the entered sales models.

In some cases, an asset identification string can include multiple sections. For example, some asset identification strings include two sections, a prefix and a root substring. In some embodiments, it can be separately determined if a given prefix or root is likely to be correct based on the likelihood of that prefix or root in the associated data. Accordingly, if the system determines that the prefix is likely to be incorrect, the system can recommend the most likely prefix (above a given probability threshold). A similar method can be used to analyze the root substring, as well.

Figure 2:
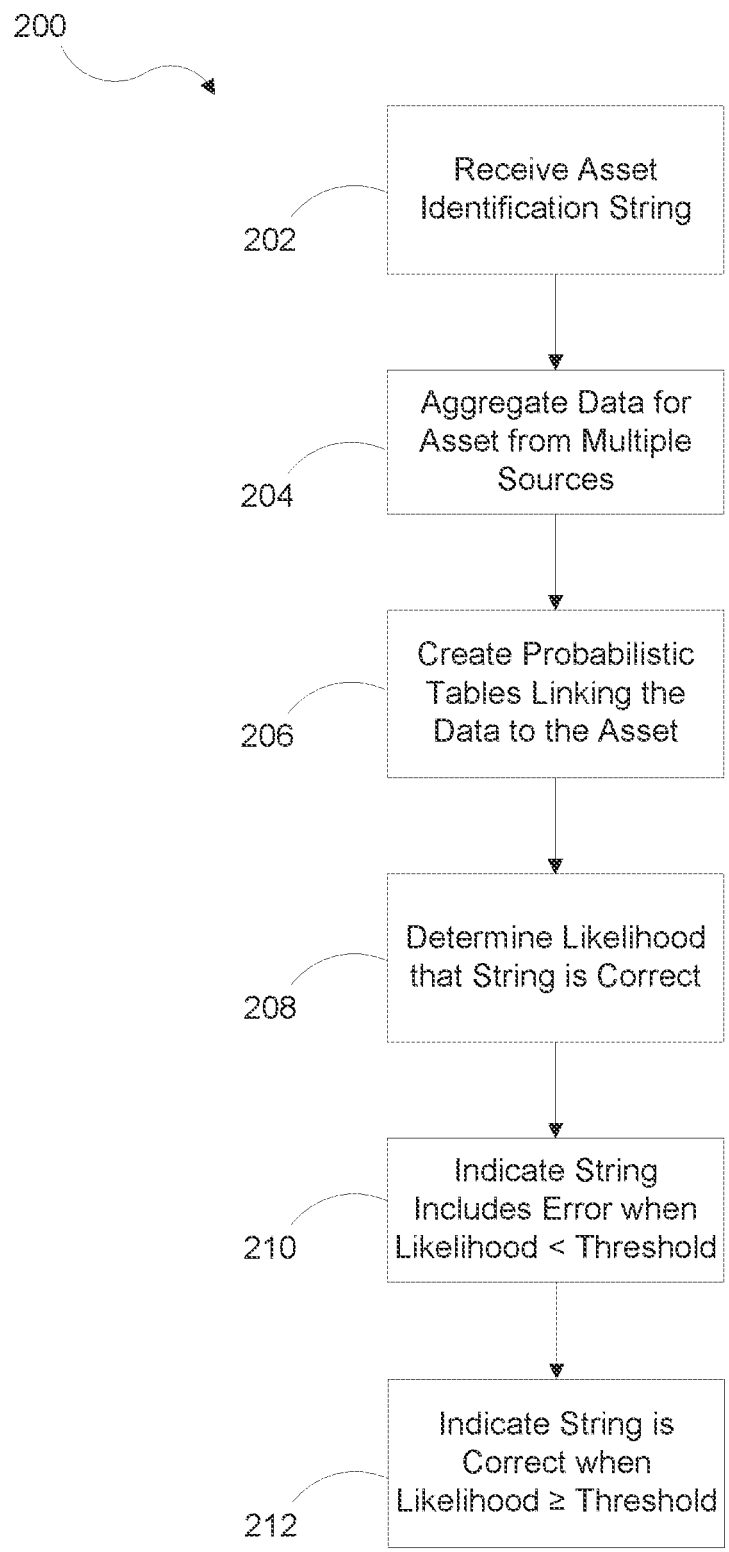
FIG. 2 is a flow diagram showing a method for asset identification string error detection according to some embodiments of the disclosed technology.

FIG. 2 is a flow diagram showing a method 200 for asset identification string error detection according to some embodiments of the disclosed technology. The method 200 can include receiving an asset identification string, at step 202, corresponding to an asset and aggregating data associated with the asset from multiple sources at step 204. The method 200 can include creating, at step 206, one or more probabilistic tables linking the aggregated data to the asset and determining, at step 208, a likelihood that at least a portion of the asset identification string is correct based on the probabilistic tables. At step 210, the method can indicate that the asset identification string includes an error when the likelihood is less than a selected threshold and otherwise indicate that the asset identification string is correct when the likelihood is greater than or equal to the selected threshold at step 212.

Suitable System

The techniques disclosed here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to cause a computer, a microprocessor, processor, and/or microcontroller (or other electronic devices) to perform a process. The machine-readable medium may include, but is not limited to, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Figure 3:
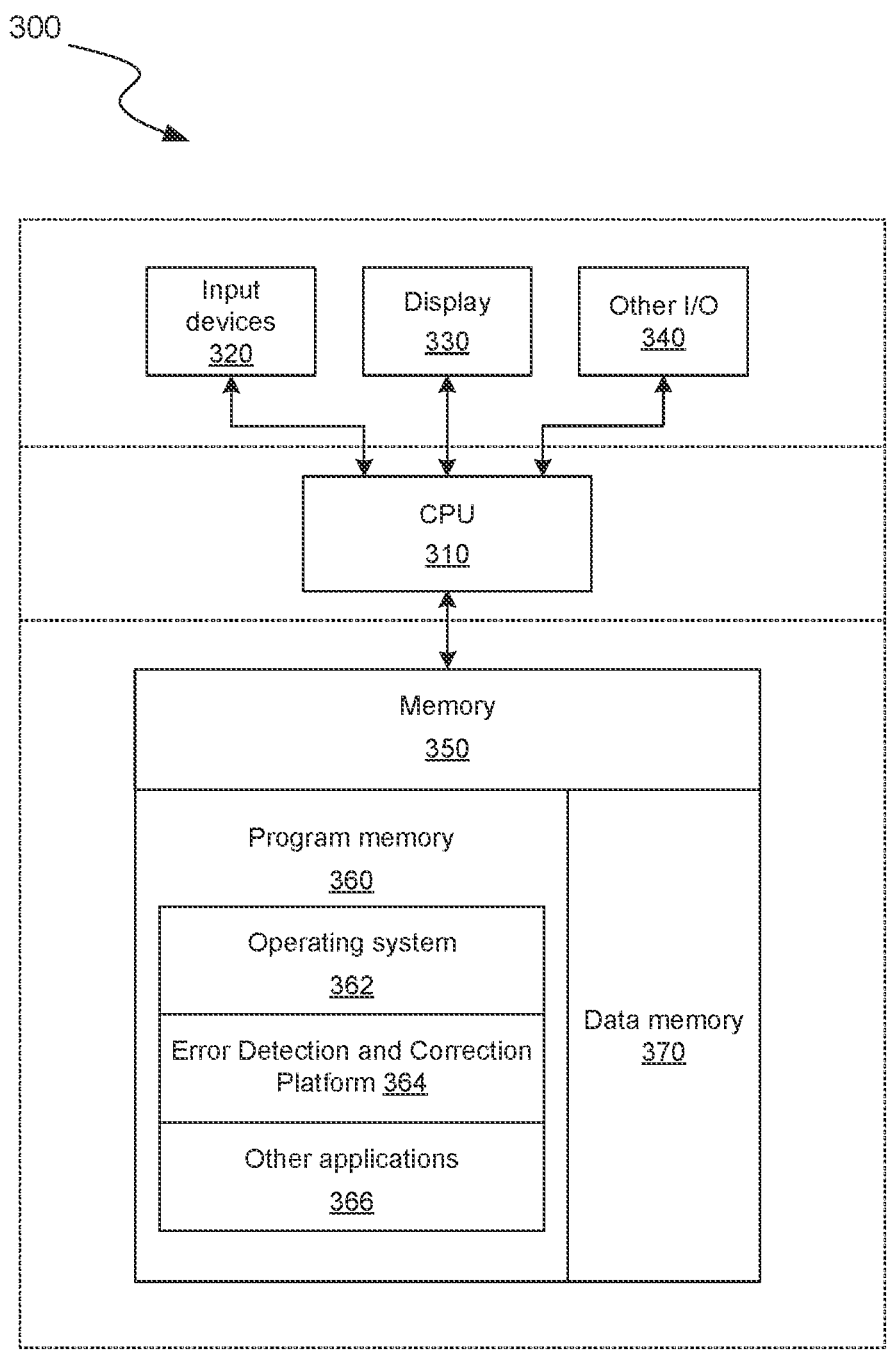
FIG. 3 is a block diagram illustrating an overview of devices on which some implementations can operate.

Several implementations are discussed below in more detail in reference to the figures. FIG. 3 is a block diagram illustrating an overview of devices on which some implementations of the disclosed technology can operate. Device 300 can include one or more input devices 320 that provide input to the CPU (processor) 310, notifying it of actions. The actions are typically mediated by a hardware controller that interprets the signals received from the input device and communicates the information to the CPU 310 using a communication protocol. Input devices 320 include, for example, a mouse, a keyboard, a touchscreen, an infrared sensor, a touchpad, a wearable input device, a camera- or image-based input device, a microphone, or other user input devices.

CPU 310 can be a single processing unit or multiple processing units in a device or distributed across multiple devices. CPU 310 can be coupled to other hardware devices, for example, with the use of a bus, such as a PCI bus or SCSI bus. The CPU 310 can communicate with a hardware controller for devices, such as for a display 330. Display 330 can be used to display text and graphics. In some examples, display 330 provides graphical and textual visual feedback to a user. In some implementations, display 330 includes the input device as part of the display, such as when the input device is a touchscreen or is equipped with an eye direction monitoring system. In some implementations, the display is separate from the input device. Examples of display devices are: an LCD display screen; an LED display screen; a projected, holographic, or augmented reality display (such as a heads-up display device or a head-mounted device); and so on. Other I/O devices 340 can also be coupled to the processor, such as a network card, video card, audio card, USB, FireWire or other external device, sensor, camera, printer, speakers, CD-ROM drive, DVD drive, disk drive, or Blu-Ray device.

In some implementations, the device 300 also includes a communication device capable of communicating wirelessly or wire-based with a network node. The communication device can communicate with another device or a server through a network using, for example, TCP/IP protocols. Device 300 can utilize the communication device to distribute operations across multiple network devices.

The CPU 310 can have access to a memory 350. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 350 can include program memory 360 that stores programs and software, such as an operating system 362, error detection and correction platform 364, and other application programs 366. Memory 350 can also include data memory 370 that can include database information, etc., which can be provided to the program memory 360 or any element of the device 300.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, mobile phones, wearable electronics, gaming consoles, tablet devices, multiprocessor systems, microprocessor-based systems, programmable consumer electronics, network PCs, minicomputers, mainframe computers, distributed computing environments that include any of the above systems or devices, or the like.

Figure 4:
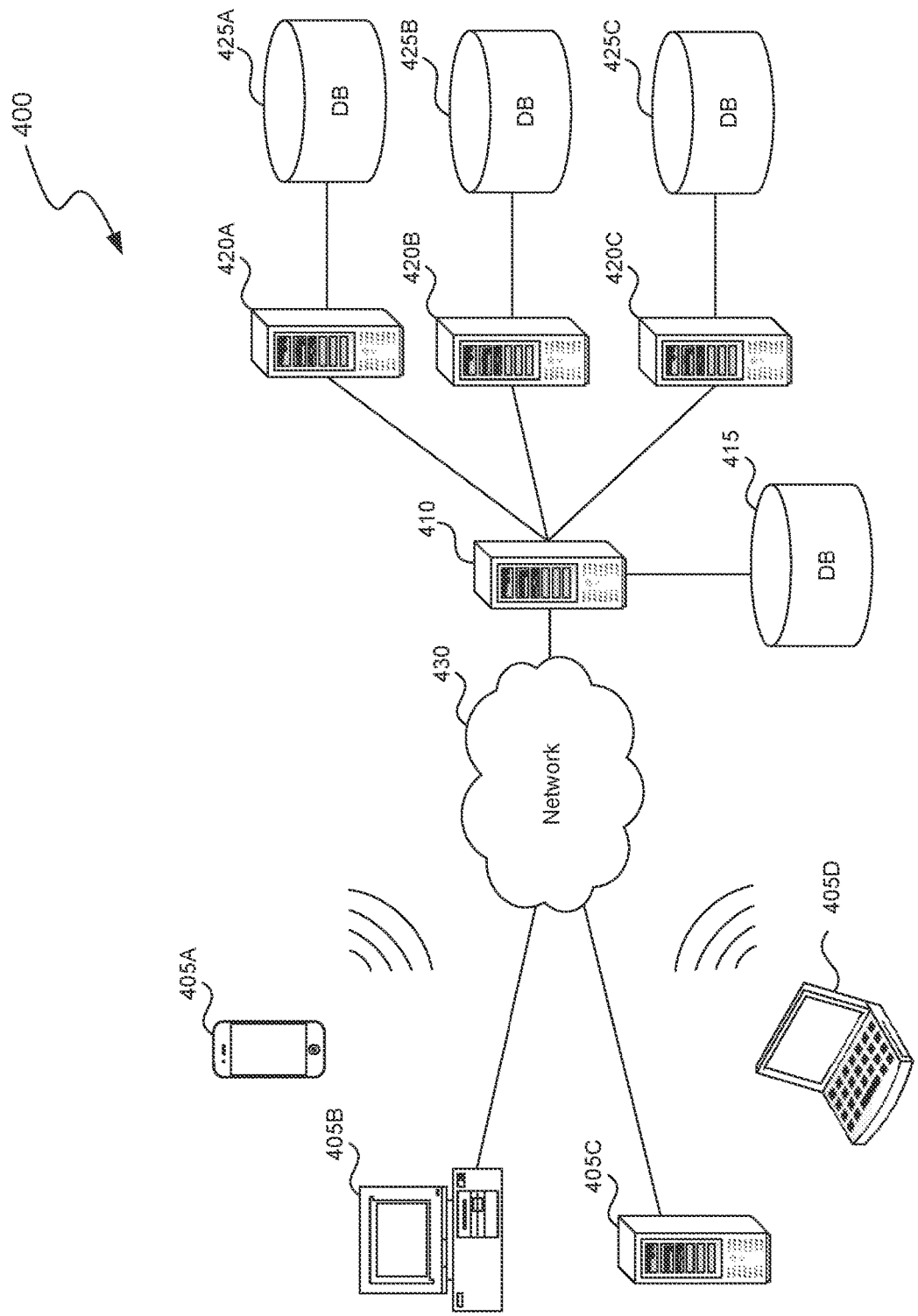
FIG. 4 is a block diagram illustrating an overview of an environment in which some implementations can operate.

FIG. 4 is a block diagram illustrating an overview of an environment 400 in which some implementations of the disclosed technology can operate. Environment 400 can include one or more client computing devices 405A-D, examples of which can include device 300. Client computing devices 405 can operate in a networked environment using logical connections through network 430 to one or more remote computers, such as a server computing device 410.

In some implementations, server computing device 410 can be an edge server that receives client requests and coordinates fulfillment of those requests through other servers, such as servers 420A-C. Server computing devices 410 and 420 can comprise computing systems, such as device 300. Though each server computing device 410 and 420 is displayed logically as a single server, server computing devices can each be a distributed computing environment encompassing multiple computing devices located at the same or at geographically disparate physical locations. In some implementations, each server computing device 420 corresponds to a group of servers.

Client computing devices 405 and server computing devices 410 and 420 can each act as a server or client to other server/client devices. Server 410 can connect to a database 415. Servers 420A-C can each connect to a corresponding database 425A-C. As discussed above, each server 420 can correspond to a group of servers, and each of these servers can share a database or can have their own database. Databases 415 and 425 can warehouse (e.g., store) information. Though databases 415 and 425 are displayed logically as single units, databases 415 and 425 can each be a distributed computing environment encompassing multiple computing devices, can be located within their corresponding server, or can be located at the same or at geographically disparate physical locations.

Network 430 can be a local area network (LAN) or a wide area network (WAN), but can also be other wired or wireless networks. Network 430 may be the Internet or some other public or private network. Client computing devices 405 can be connected to network 430 through a network interface, such as by wired or wireless communication. While the connections between server 410 and servers 420 are shown as separate connections, these connections can be any kind of local, wide area, wired, or wireless network, including network 430 or a separate public or private network.

Figure 5:
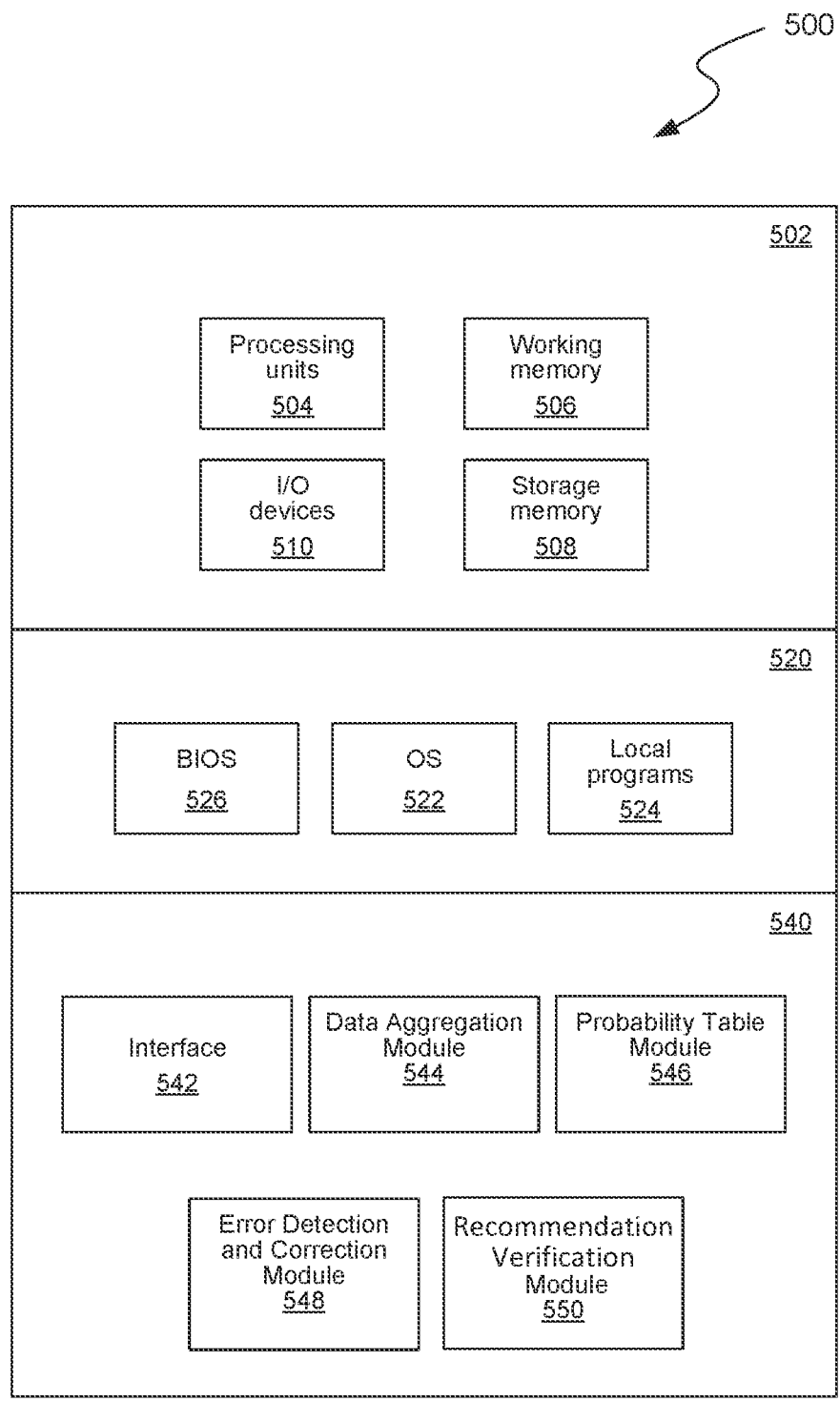
FIG. 5 is a block diagram illustrating components which, in some implementations, can be used in a system employing the disclosed technology.

FIG. 5 is a block diagram illustrating components 500 which, in some implementations, can be used in a system employing the disclosed technology. The components 500 include hardware 502, general software 520, and specialized components 540. As discussed above, a system implementing the disclosed technology can use various hardware, including processing units 504 (e.g., CPUs, GPUs, APUs, etc.), working memory 506, storage memory 508, and input and output devices 510. Components 500 can be implemented in a client computing device such as client computing devices 405 or on a server computing device, such as server computing device 410 or 420.

General software 520 can include various applications, including an operating system 522, local programs 524, and a basic input output system (BIOS) 526. Specialized components 540 can be subcomponents of a general software application 520, such as local programs 524. Specialized components 540 can include a Data Aggregation Module 544, a Probability Table Module 546, an Error Detection and Correction Module 548, a Recommendation Verification Module 550, and components that can be used for transferring data and controlling the specialized components, such as Interface 542. In some implementations, components 500 can be in a computing system that is distributed across multiple computing devices or can be an interface to a server-based application executing one or more of specialized components 540.

Those skilled in the art will appreciate that the components illustrated in FIGS. 3-5 described above, and in each of the flow diagrams discussed above, may be altered in a variety of ways. For example, the order of the logic may be rearranged, sub steps may be performed in parallel, illustrated logic may be omitted, other logic may be included, etc. In some implementations, one or more of the components described above can execute one or more of the processes described herein.

INDUSTRIAL APPLICABILITY

In some embodiments, a system for identifying and correcting errors in erroneous asset identification strings can include a Data Aggregation Module 544, a Probability Table Module 546, an Error Detection and Correction Module 548, and a Recommendation Verification Module 550 (FIG. 5). In operation, the Data Aggregation Module 544 can receive an asset identification string corresponding to an asset. The module 544 can then aggregate data associated with the asset from multiple sources. The Data Aggregation Module 544 can receive the asset identification string from a user who wishes to check a particular string for errors. In other cases, the string can be received as part of a process to check all of or a list of asset identification strings. The Data Aggregation Module 544 can be configured to remove outliers, cleanse the data, and reformat the data for processing. The Probability Table Module 546 can create one or more probabilistic tables linking the aggregated data received from Module 544 to the asset. The Error Detection and Correction Module 548 is configured to determine a likelihood that an asset identification string for a record is correct based on the probabilistic tables from Module 546. If a string is in error the module 548 can provide one or more recommended replacement strings. The Recommendation Verification Module 550 can present the one or more recommended replacement strings to a user to verify that the recommended string is correct and/or select a recommended string.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. One or more memory devices storing instructions thereon for asset identification string error detection, the instructions, when executing by one or more processors, configured to cause the one or more processors to perform operations comprising:
receiving an asset identification string associated with an asset;
aggregating data associated with the asset from multiple source computing systems, the multiple source computing systems comprising two or more of asset owner data, asset dealer data, asset manufacturing data, asset sales data, and asset use data;
creating one or more probabilistic tables linking the aggregated data to the asset;
using a computer-based model, using the one or more probabilistic tables, determining a likelihood that at least a portion of the asset identification string indicates that an association between the asset identification string and the asset is correct;

indicating that the association between the asset identification string and the asset is incorrect when the likelihood is less than a tunable threshold;

indicating that the association between the asset identification string and the asset is correct when the likelihood is greater than or equal to the tunable threshold;

upon detecting that the association between the asset identification string and the asset is incorrect, replacing the portion with a replacement string when the replacement string has a probability based on the tables greater than the tunable threshold or otherwise generating at least one replacement string recommendation; and updating the tunable threshold of the computer-based model to integrate a verification result for the at least one replacement string recommendation.

2. The one or more memory devices of claim 1, wherein the asset identification string includes at least a prefix substring and a root substring.

3. The one or more memory devices of claim 2, wherein the portion of the asset identification string is the prefix substring.

4. The one or more memory devices of claim 2, wherein the portion of the asset identification string is the root substring.

5. The one or more memory devices of claim 1, the operations further comprising presenting the replacement string or replacement string recommendations to a user for verification.

6. A method for asset identification string error detection and correction, the method comprising:

receiving an asset identification string associated with an asset;

verifying that the asset identification string is valid and correctly formatted;

aggregating data associated with the asset from multiple source computing systems, the multiple source computing systems comprising two or more of asset owner data, asset dealer data, asset manufacturing data, asset sales data, and asset use data;

creating one or more probabilistic tables linking the aggregated data to the asset;

using a computer-based model,
using the one or more probabilistic tables, determining a likelihood that at least a portion of the asset identification string indicates that an association between the asset identification string and the asset is correct;

indicating that the association between the asset identification string and the asset is incorrect when the likelihood is less than a tunable threshold;

indicating that the association between the asset identification string and the asset is correct when the likelihood is greater than or equal to the tunable threshold;

upon detecting that the association between the asset identification string and the asset is incorrect, replacing the portion with a replacement string when the replacement string has a probability based on the tables greater than the tunable threshold or otherwise generating at least one replacement string recommendation; and updating the tunable threshold of the computer-based model to integrate a verification result for the at least one replacement string recommendation.

7. The method of claim 6, wherein the asset identification string includes at least a prefix substring and a root substring.

8. The method of claim 7, wherein the portion of the asset identification string is the prefix substring.

9. The method of claim 7, wherein the portion of the asset identification string is the root substring.

10. The method of claim 6, further comprising presenting the replacement string or replacement string recommendations to a user for verification.

11. A system for asset identification string error detection, comprising:

one or more processors; and one or more memory devices having stored thereon instructions that when executed by the one or more processors cause the one or more processors to:

receive an asset identification string associated with an asset;

aggregate data associated with the asset from multiple source computing systems, the multiple source computing systems comprising two or more of asset owner data, asset dealer data, asset manufacturing data, asset sales data, and asset use data;

create one or more probabilistic tables linking the aggregated data to the asset;

using a computer-based model,
using the one or more probabilistic tables, determine a likelihood that at least a portion of the asset identification string indicates that an association between the asset identification string and the asset is correct;

indicate that the association between the asset identification string and the asset is incorrect includes an error when the likelihood is less than a tunable threshold;

indicate that the association between the asset identification string and the asset is correct when the likelihood is greater than or equal to the tunable threshold;

upon detecting that the association between the asset identification string and the asset is incorrect, replace the portion with a replacement string when the replacement string has a probability based on the tables greater than the tunable threshold or otherwise generating at least one replacement string recommendation; and update the tunable threshold of the computer-based model to integrate a verification result for the at least one replacement string recommendation.

12. The system of claim 11, wherein the asset identification string includes at least a prefix substring and a root substring.

13. The system of claim 12, wherein the portion of the asset identification string is the prefix substring.

14. The system of claim 12, wherein the portion of the asset identification string is the root substring.

15. The system of claim 11, further comprising presenting the replacement string or replacement string recommendations to a user for verification.

\* \* \* \* \*